June 19, 1962 G. M. JOHNSTON 3,039,828
ENDLESS TRACK TRACTION MEANS FOR MOVING VEHICLES OR THE LIKE
Filed June 13, 1960
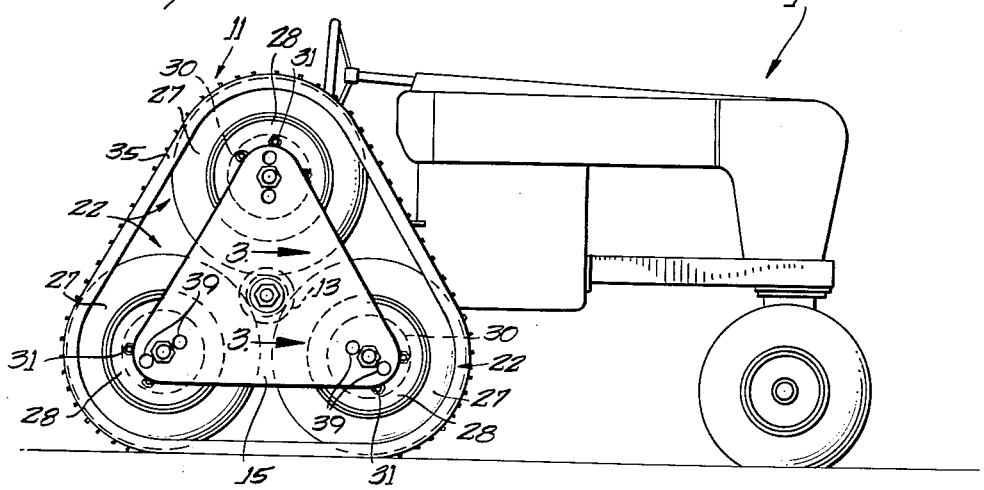
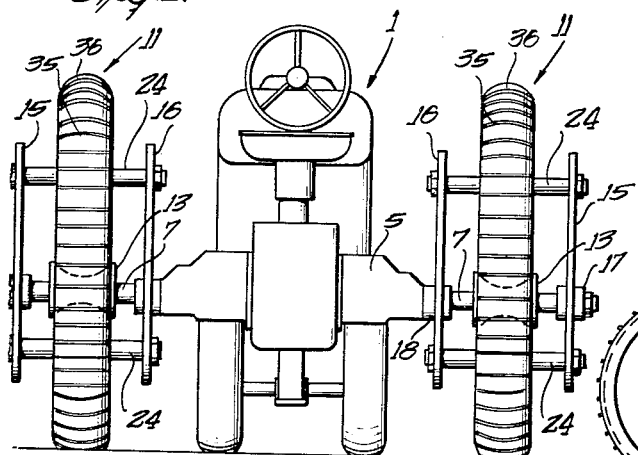
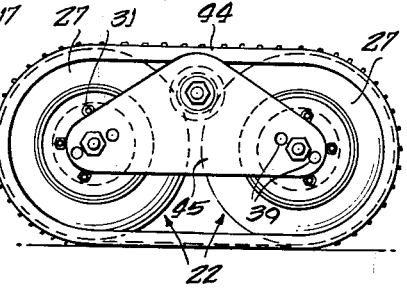
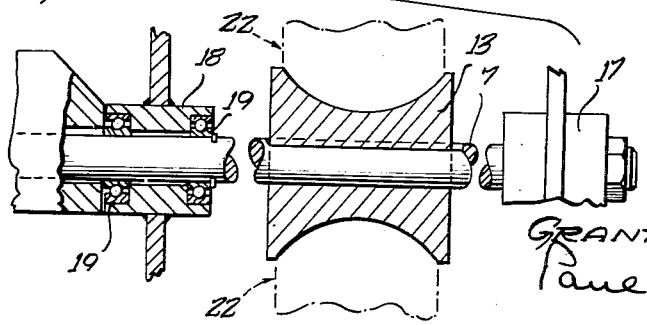
INVENTOR
GRANT M. JOHNSTON
ATTORNEY

United States Patent Office 3,039,828
Patented June 19, 1962

3,039,828
ENDLESS TRACK TRACTION MEANS FOR MOVING VEHICLES OR THE LIKE
Grant M. Johnston, Burlington, Ontario, Canada, assignor to International Harvester Company, Chicago, Ill., a corporation of New Jersey
Filed June 13, 1960, Ser. No. 35,743
8 Claims. (Cl. 305—25)

This invention relates to vehicles and the like and more particularly to traction means for propelling or moving a vehicle or the like.

It is an object of the invention to provide inexpensive endless track traction means for moving a vehicle or the like.

It is another object of the invention to provide inexpensive endless track traction means for moving a vehicle or the like which can be placed on each end of the rear axle of a wheeled tractor, for instance, after removal of or in lieu of the large drive wheels of the tractor to convert the tractor into an endless track driven vehicle.

It is still another object to provide an extremely simple and inexpensive way for a farmer, for instance, and especially one in the low income bracket, to convert a wheeled tractor, for instance, into one having endless track traction means for propelling the same in conditions of poor traction such as in snow, mud, or sand, by the use largely of discarded or unused material already on hand or easily procurable at little or no cost. Such material may consist of old automobile wheels with worn tires thereon and endless tracks fabricated from old tire casings cut for proper length and fastened together in a conventional manner.

Yet another object is to provide such traction means for conversion of a wheeled tractor, for instance, into one having endless track traction means which will substantially reduce compaction of loose earth in the fields, for instance, by dividing and spreading the load of the rear axle across the entire lengths of the endless tracks in engagement with the ground.

A further object is to provide such a converted vehicle which will have greatly improved flotation and traction in poor traction conditions such as in snow, mud, and sand.

A still further object is to provide inexpensive endless track traction means for propelling a farm tractor, for instance, which allows the tractor to move at sustained, uniform creeping speed for hand planting from the tractor or towed means, for instance, without the need of a special or additional costly gear reduction unit in the tractor.

Another object is to provide inexpensive endless track traction means for moving a vehicle or the like which is adjustable to ground irregularities and contour for substantially full tractive engagement between the ground engageable length of each endless track and the ground.

Yet another object is to provide inexpensive endless track traction means having a plurality of runs and being mounted for rotation about the axis of the axle from which it receives its driving power whereby to permit rotation of the traction means about the axis so as to present another run to the ground upon movement of the traction means in certain deep depressions to prevent the vehicle from becoming stuck and allow the same to extract or dig itself therefrom.

Other objects, advantages, and features of the invention will appear from the following illustrative description, read with the accompanying drawing, in which:

FIGURE 1 is a side elevational view of a farm type tractor incorporating a preferred form of the invention;

FIGURE 2 is a rear elevational view of the same;

FIGURE 3 is a fragmentary, enlarged sectional view taken on the line 3—3 of FIGURE 1; and FIGURE 4 is a side elevational view of another form of the traction device shown alone.

Referring to the drawing in detail and at the outset to FIGURES 1 through 3 thereof, the reference numeral 1 generally denotes a farm type tractor including a transversely extending rear axle housing 5 and right hand and left hand shaft portions 7 of the rear axle of the tractor supported within the housing 5.

The reference numerals 11 generally designates endless track traction means of this invention, one of the traction means being mounted on each end of the rear axle.

Each traction means comprises a central sheave or pulley 13 constituting driving means which is mounted on one of the shaft portions 7 of the rear axle so as to be rotatable therewith. A pair of identical supporting plate members 15 and 16 is positioned one member on each side of the central sheave 13, being rotatably mounted on the shaft portion 7 by means of central hub portions 17 and 18 and anti-friction bearings 19. A plurality of wheels 22, namely, three in number is positioned between the supporting plate members 15 and 16 on stub shafts or axles 24 suitably positioning the plate members in spaced-apart parallel relation to each other and suitably retained on the plate members by means of nuts, as shown.

Each of the wheels 22 consists of an automobile or automobile type wheel including the outer annular inflatable tire 27 of either the tube or tubeless type and inner wheel disk portion 28. The wheels, which may be taken from derelict automobiles, may also include the central hub portions 30 of the automobile wheels or suitable hubs may be provided from other sources. In any event the wheel disks 28 with their carried tires 27 are secured to hub portions 30 by the usual removable bolts 31. The wheels 22 together with the hub portions 30 are rotatably supported on the axles 24 of the supporting means 15, 16, as is apparent from the drawing. The outer peripheries of the wheels 22 are received in driven relation within the central sheave 13.

An endless track 35 having cleats 36 extends around the outer peripheries of the wheels 22 of each of the traction means 11 in driven engagement with the wheel peripheries. These endless tracks may be fabricated from old automobile tire casings cut for proper length of the tracks and connected together by suitable means presently known, or other forms of cleated track may be employed. In the case of tracks formed from tire casings, the same are concave on the insides so as to remain on the wheels 22. Where other forms of track are employed, the same would have to be slightly concave or equipped with lugs or other means for retaining the track on the wheels 22.

According to the present invention, the wheels 22 together with the hubs 30 are on the axles 24, for rotation thereabout, in deflated condition of the tires 27 thereof, the tracks 35 having been placed over the wheels of the respective traction means 11 previous to their mounting on the axles or being placed thereover after mounting of the wheels on the axles while the tires are in such deflated condition. The tires 27 of the wheels are then conveniently inflated in the usual manner into firm driven engagement with the central sheave 13 and also into non-slipping driving engagement with the tracks 35 by creating a certain tension in the later tracks through the inflation process. The hubs 30 from automobiles or other sources may be placed on the axles 24 first or furnished thereon and the wheels 22 without the hubs may be subsequently mounted on the hubs by the use of the connecting bolts 31, if desired, as is customary in the mounting or changing of automobile wheels. In the present instance, the wheels 22 may also be as conveniently changed by removal and replacement of the bolts 31.

Additional holes 39 are provided in each corner of each supporting plate 15 and 16 of the traction means 11 so as to permit the use of different size wheels 22. These holes are so located as to permit the different size wheels to have driven engagement with the sheave 13. Where different size wheels are used, of course, tracks 35 of different lengths must also be used. Assembly of different size wheels in the traction units together with their tracks, which can be quickly and easily accomplished, changes the clearance between the rear axle housing 5 and the ground which may be desired for use of the tractor with certain crops over which the tractor must move.

By virtue of the rotatable mounting of the entire traction units 11 on the shaft portions 7 of the tractor, these units are pivotable or oscillatable about the axis of the shaft portions during movement of the tractor over the ground so as to adjust to ground irregularities and the contour of the terrain so as to provide substantially full tractive engagement between each of the units and the ground over which they are passing at all times. It is important to note in this connection that each of the units 7 is individually adjustable for this full tractive engagement independently of the other. Thus, a sort of independent bogie action is provided.

Although not ordinarily encountered with a farm type tractor, the rotatable mounting of the traction units 11 on the shaft portions 7 permits the units to extract themselves from deep depressions into which they may fall, including even a trench or ditch, by allowing the units to rotate about the shaft axes so as to present other runs or sides of the endless tracks thereof against the forward side of the depression so as to permit the same to climb therefrom. This type of construction therefore prevents the traction units from becoming stuck or lodged in any such depression. Of course, a different type of front support would have to be provided in a vehicle in which this feature is to be used to the fullest other than small front wheels shown in the illustrated tractor.

Also of very great importance in the present invention, a substantial speed reduction is provided between the central driving means or sheave 13 and the endless tracks 35 by means of the relatively small interposed wheels 22 arranged in planetary fashion therebetween. This substantial speed reduction permits the tractor to move at a sustained, uniform creeping speed so as to permit hand planting, for instance, from the tractor or drawn means without the need of a special or additional costly gear reduction unit in the tractor.

It is also most important that the load on the rear axle is divided between the lower two wheels of each traction until 11 thereby to spread the load and reduce its concentration on the ground or surface over which the tractor is moving. This is of great significance in that it virtually eliminates compaction of loose earth in the fields from the driving wheels and further, and even more important, it provides greatly increased flotation and traction of the units 11 in conditions of poor traction such as in snow and sand and especially in mud and water soaked earth.

FIGURE 4 shows another form of traction means wherein only a pair of wheels 22 are employed, of the same type as those of the previous form, and endless tracks 44 of somewhat less length. The wheels are supported by triangular supporting plates 45 similar to those used in the other form and which are rotatable about the shaft axes in the same manner for adjustment to ground irregularities as previously noted in connection with the other form. This form employs less material than the other one but does not have quite as much driving power because of the driven engagement of only two rather than three wheels 22 with the central driving means or sheave 13.

Plates 45 are rotatable about the axes of shafts 7 between positions in which axles 24 of wheels 22 are either above or below shafts 7, as desired. The alternate positions thus available provide for flexibility in vehicle operation.

It is therefore seen that an extremely inexpensive and easy way is provided a farmer, for instance, and especially one in the low income bracket, to convert or equip an ordinary wheel type farm tractor into or as one having endless track traction means by employing common low cost hardware units consisting of old automobile wheels and tire casings which may otherwise be unused or which may be easily obtained at little or no cost. As previously mentioned, the wheels 22 are conveniently placeable on the hubs 30 and quickly securable thereto by the usual bolts 39 as in the case of changing a wheel in an automobile, or the entire wheels together with the hubs may be slipped onto the axles 24, and the tires 27 quickly and easily inflatable into the driven and driving engagement with the central sheave and outer track, respectively.

Although certain forms of the invention have been illustrated and described, it is not desired to be limited to these forms but rather other forms and constructions are contemplated which are intended to be included within the terms of the appended claims which should be liberally construed in the light of the over-all spirit of the invention in its various aspects.

What is claimed is:

1. In a tractor or other vehicle having transverse rotatable shaft means along an axis and adapted to have a pair of relatively large wheels mounted thereon at the opposite sides of the tractor respectively, the combination comprising a pair of driving means on the shaft means at the opposite sides of the tractor respectively a plurality of relatively small wheels at each side of the tractor, means at each side of the tractor supporting the wheels in driveable engagement with the driving means and a pair of endless tracks engaging portions of the outer peripheries of the wheels at each side of the tractor respectively in driveable relation therewith and engageable with the ground for at least assisting in moving the tractor relative to the ground upon rotation of the shaft means, two of the wheels at each side of the tractor being adjacent the ground, the wheel supporting means being supported for at least limited rotational movement substantially about the axis of the shaft means and independent of shaft means rotation, the wheel supporting means at each side of the tractor being at least limitedly rotatable relative to the wheel supporting means at the opposite side of the tractor about the axis of the shaft means, the axis of the shaft means being at least normally above the axes of said two wheels at each side of the tractor when the tractor is on level ground, each of the driving means comprising means having a wheel engaging peripheral surface extending around the axis thereof and being substantially equidistant from such axis at substantially all wheel engaging sections thereof normal to such axis, each wheel having an inflatable tire for engagement with the peripheral surface of the driving means and the track which tire is inflatable simultaneously into the driveable engagement of the wheel with the driving means it engages and the driving engagement of the wheel with the track it engages, the tracks being placed under tension by such inflation of all the tires for tight driving engagement between the tires and tracks.

2. The subject matter of claim 1 in which the plurality of wheels at each side of the tractor consists of two wheels and the wheel supporting means are supported for complete rotational movement substantially about the axis of the shaft means and independent of shaft means rotation so as to provide an alternate position of the tractor when the wheel supporting means are rotated substantially 180° from their normal positions with the shaft means above the axes of the wheels when the tractor is on level ground, the shaft means being below the axes of the wheels in the rotated positions of the wheel supporting means.

3. In a tractor or other vehicle having transverse rotatable shaft means along an axis and intended to have a pair of relatively large wheels on the shaft means at the opposite sides of the tractor respectively, the combination comprising a pair of driving means on the shaft means at the opposite sides of the tractor respectively a plurality of relatively small wheels at each side of the tractor, means at each side of the tractor supporting the wheels in driveable engagement with the driving means, and a pair of endless tracks engaging portions of the outer peripheries of the wheels at each side of the tractor respectively in driveable relation therewith and engageable with the ground for at least assisting in moving the tractor relative to the ground upon rotation of the shaft means, at least two of the wheels at each side of the tractor being adjacent the ground, the wheel supporting means being supported for at least limited rotational movement substantially about the axis of the shaft means and independent of shaft means rotation, the wheel supporting means at each side of the tractor being at least limitedly rotatable relative to the wheel supporting means at the opposite side of the tractor about the axis of the shaft means, the axis of the shaft means being at least normally above the axes of said two wheels at each side of the tractor when the tractor is on level ground sufficiently to at least approximately keep the tractor at the same position relative to the ground as would the pair of relatively large wheels, each wheel having an inflatable tire for engagement with the driving means and track which tire is inflatable simultaneously into the driveable engagement of the wheel with the driving means it engages and the driving engagement of the wheel with the track it engages, the tracks being placed under tension by such inflation of all the tires for tight driving engagement between the tires and tracks.

4. The subject matter of claim 3 in which at least part of each track is made substantially entirely of portions of auto tires.

5. The subject matter of claim 3 in which the plurality of wheels at each side of the tractor consists of two wheels and the wheel supporting means are supported for complete rotational movement substantially about the axis of the shaft means and independent of shaft means rotation so as to provide an alternate position of the tractor when the wheel supporting means are rotated substantially 180° from their normal positions with the shaft means above the axes of the wheels when the tractor is on level ground, the shaft means being below the axes of the wheels in the rotated positions of the wheel supporting means.

6. The subject matter of claim 5 in which at least part of each track is made substantially entirely of portions of auto tires.

7. The subject matter of claim 8 in which at least part of each track is made substantially entirely of portions of auto tires.

8. The subject matter of claim 3 in which the wheel supporting means are supported for complete rotational movement substantially about the axis of the shaft means and independent of shaft means rotation.

References Cited in the file of this patent
UNITED STATES PATENTS

| | | |
|---|---|---|
| 1,238,762 | Hopeman | Sept. 4, 1917 |
| 1,453,782 | Bell | May 1, 1923 |
| 2,124,708 | Peter | July 26, 1938 |
| 2,416,679 | Curtis | Mar. 4, 1947 |